United States Patent
Sun et al.

(10) Patent No.: US 10,631,178 B2
(45) Date of Patent: Apr. 21, 2020

(54) CONTROL RESOURCE SET GROUP DESIGN FOR IMPROVED COMMUNICATIONS DEVICES, SYSTEMS, AND NETWORKS

(71) Applicant: QUALCOMM Incorporated, San Diego, CA (US)

(72) Inventors: Jing Sun, San Diego, CA (US); Wanshi Chen, San Diego, CA (US); Yang Yang, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 15/888,950

(22) Filed: Feb. 5, 2018

(65) Prior Publication Data

US 2018/0227777 A1    Aug. 9, 2018

Related U.S. Application Data

(60) Provisional application No. 62/455,574, filed on Feb. 6, 2017.

(51) Int. Cl.
*H04W 72/04* (2009.01)
*H04W 24/02* (2009.01)
(Continued)

(52) U.S. Cl.
CPC ........... *H04W 24/02* (2013.01); *H04L 5/0044* (2013.01); *H04L 5/0053* (2013.01);
(Continued)

(58) Field of Classification Search
None
See application file for complete search history.

(56) References Cited

U.S. PATENT DOCUMENTS

2013/0121295 A1* 5/2013 Saito .................. H04L 5/001
370/329
2014/0293946 A1* 10/2014 Suzuki .................. H04W 48/12
370/329

(Continued)

OTHER PUBLICATIONS

Huawei "Dynamic Resource Multiplexing of Downlink Data Control" Jan. 2017 (Year: 2017).*

(Continued)

*Primary Examiner* — Ayanah S George
(74) *Attorney, Agent, or Firm* — Norton Rose Fulbright, LLP

(57) ABSTRACT

Systems, methods, apparatuses and computer-readable storage media for configuring a transmission between a base station and a user equipment (UE) equipment are disclosed. In embodiments, a plurality of control resource sets (Coresets) may be determined, and the plurality of Coresets may be grouped into one or more Corset groups. In embodiments, a Coreset group may include a first Coreset and a second Coreset. The first Coreset may provide a common search space, and the second Coreset may provide a UE specific search space. The one or more Coreset groups may be used to configure a transmission of data to the UE. The first Coreset and the second Coreset for a particular Coreset group may be configured to enable narrow band monitoring of the Coreset group by the UE.

30 Claims, 6 Drawing Sheets

(51) Int. Cl.
  H04W 24/08    (2009.01)
  H04L 5/00     (2006.01)
  H04W 52/02    (2009.01)
  H04W 88/08    (2009.01)
  H04W 88/02    (2009.01)

(52) U.S. Cl.
  CPC ........... *H04L 5/0094* (2013.01); *H04W 24/08* (2013.01); *H04W 52/0212* (2013.01); *H04W 72/042* (2013.01); *H04W 72/048* (2013.01); *H04L 5/001* (2013.01); *H04W 88/02* (2013.01); *H04W 88/08* (2013.01)

(56) References Cited

U.S. PATENT DOCUMENTS

2016/0128054 A1*  5/2016  Noh .................. H04W 56/0015
                                                          370/280
2017/0142712 A1*  5/2017  Lee .................. H04W 72/0446

OTHER PUBLICATIONS

Interdigital Communications: "Downlink Control Channel Framework", 3GPP Draft; R1-1700704, 3rd Generation Partnership Project (3GPP), Mobile Competence Centre; 650, Route Des Lucioles; F-06921 Sophia-Antipolis Cedex; France, vol. RAN WG1, No. Spokane, USA; Jan .16, 2017-Jan. 20, 2017, Jan. 10, 2017 (Jan. 10, 2017), XP051203023, 4 pages, Retrieved from the Internet: URL:http://www.3gpp.org/ftp/tsg_ran/WG1_RL1/TSGR1_AH/NR_AH_1701/Docs/ [retrieved on Jan. 10, 2017].

3GPP TR 38.802, "3rd Generation Partnership Project; Technical Specification Group Radio Access Network; Study on New Radio (NR) Access Technology Physical Layer Aspects," Release 14, 3rd Generation Partnership Project (3GPP), Mobile Competence Centre; 650, Route Des Lucioles; F-06921 Sophia-Antipolis Cedex; France, vol. RAN WG1, No. V1.1.0, Feb. 3, 2017, XP051230711, pp. 1-71, [retrieved on Feb. 3, 2017].

Catt: "Indication of NR-PDSCH Starting Symbol", 3GPP Draft; R1-1700194, vol. RAN WG1, no. Spokane, USA; Jan. 16, 2017-Jan. 20, 2017, Jan. 16, 2017 (Jan. 16, 2017), pp. 1-2, XP051207734.

ETRI: "Discussion on Control Resource Set and DMRS for DL Control Channel", 3GPP Draft; R1-1700581, vol. RAN WG1, no. Spokane, USA; Jan. 16, 2017-Jan. 20, 2017, Jan. 16, 2017 (Jan. 16, 2017), pp. 1-3, XP051208110.

Huawei, et al., "Dynamic Resource Multiplexing of Downlink Control and Data", 3GPP Draft; R1-1700397, vol. RAN WG1, no. Spokane, USA; Jan. 16, 2017-Jan. 20, 2017, Jan. 16, 2017 (Jan. 16, 2017), 3 pages, XP051207934.

Intel Corporation: "Physical Downlink Control Channel Design for NR", 3GPP Draft; R1-1700359, vol. RAN WG1, no. Spokane, USA; Jan. 16, 2017-Jan. 20, 2017, Jan. 16, 2017 (Jan. 16, 2017), 5 pages, XP051207896.

International Search Report and Written Opinion—PCT/US2018/017075—ISA/EPO—dated Aug. 21, 2018.

* cited by examiner

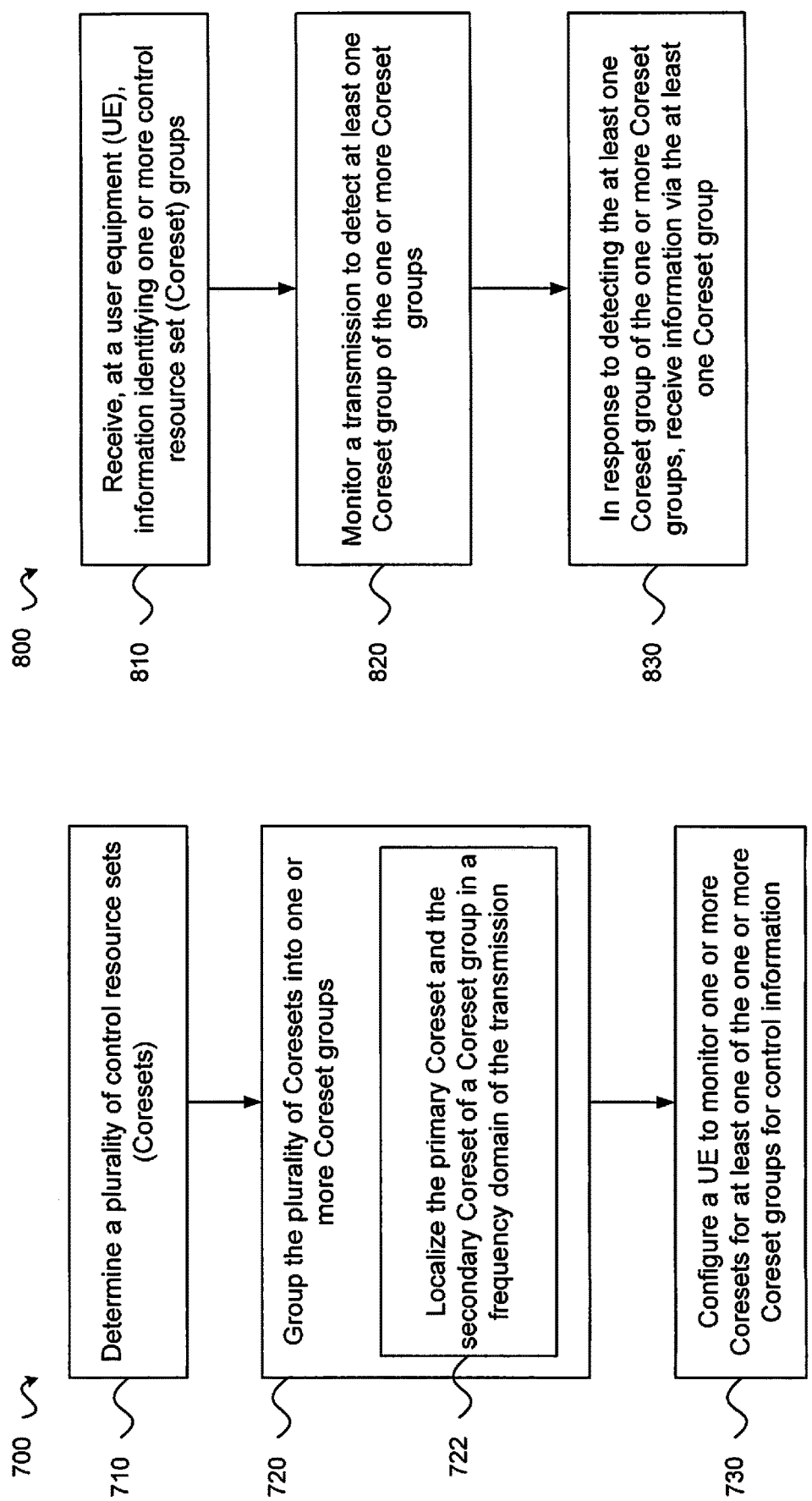

CONTROL RESOURCE SET GROUP DESIGN FOR IMPROVED COMMUNICATIONS DEVICES, SYSTEMS, AND NETWORKS

PRIORITY

The present application claims priority to and the benefit of U.S. Provisional Patent Application No. 62/455,574, filed Feb. 6, 2017 and entitled "CONTROL RESOURCE SET GROUP DESIGN FOR NR," the contents of which are incorporated herein by reference in its entirety as is fully set forth below and for all applicable purposes.

TECHNICAL FIELD

Aspects of the present disclosure relate generally to wireless communication systems, and more particularly, to methods, systems, apparatuses, and networks providing improved wireless communications and resource utilization through control resource sets (Coresets).

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for configuring a transmission to a UE is provided. For example, a method can include determining a plurality of control resource sets (Coresets), and grouping the plurality of Coresets into one or more Coreset groups. Each of the one or more Coreset groups can include a primary Coreset and zero or more secondary Coresets. The method can also include configuring a UE to monitor one or more Coresets for at least one of the one or more Coreset groups for control information.

In an additional aspect of the disclosure, a method for configuring a resource reuse configuration of a transmission that includes one or more Coresets is provided. For example, a method can include determining a resource reuse configuration for a transmission that includes one or more Coresets. The resource reuse configuration can indicate a scheme for utilizing unused resources in the one or more Coresets for data transmission. The method can also include communicating the resource reuse configuration for the transmission of data to the UE.

In an additional aspect of the disclosure, a method for receiving information is provided. For example, a method can include receiving, at a UE, information identifying one or more Coreset groups. Each of the one or more Coreset groups can include a primary Coreset and zero or more secondary Coresets. The method can also include monitoring a transmission to detect at least one Coreset group of the one or more Coreset groups, and, in response to detecting the at least one Coreset group of the one or more Coreset groups, receiving information via the at least one Coreset group.

In an additional aspect of the disclosure, a computer-readable storage medium storing instructions that, when executed by one or more processors, can cause the one or more processors to perform operations for configuring a transmission to a UE is provided. For example, a computer-readable storage medium can store instructions that, when executed by one or more processors, cause the one or more processors to perform operations for determining a plurality of Coresets, and grouping the plurality of Coresets into one or more Coreset groups. Each of the one or more Coreset groups can include a primary Coreset and zero or more secondary Coresets. The instructions, when executed by one or more processors, may also cause the one or more processors to perform operations for configuring a UE to monitor one or more Coresets for at least one of the one or more Coreset groups for control information.

In an additional aspect of the disclosure, a computer-readable storage medium storing instructions that, when executed by one or more processors, can cause the one or more processors to perform operations for configuring a resource reuse configuration for a transmission that includes one or more Coresets is provided. For example, a computer-readable storage medium can store instructions that, when executed by one or more processors, cause the one or more processors to perform operations for determining a resource reuse configuration for a transmission that includes one or more Coresets. The resource reuse configuration can indicate a scheme for utilizing unused resources in the one or more Coresets for data transmission. The instructions, when executed by one or more processors, may also cause the one or more processors to perform operations for communicating the resource reuse configuration for the transmission to the UE.

In an additional aspect of the disclosure, a computer-readable storage medium storing instructions that, when executed by one or more processors, can cause the one or more processors to perform operations for receiving information is provided. For example, a computer-readable storage medium can store instructions that, when executed by one or more processors, cause the one or more processors to perform operations for receiving, at a UE, information identifying one or more Coreset groups. Each of the one or more Coreset groups can include a primary Coreset and zero or more secondary Coresets. The instructions, when executed by one or more processors, may also cause the one or more processors to perform operations for monitoring a transmission to detect information provided via at least one Coreset group of the one or more Coreset groups and, in response to detecting the information provided via the at least one Coreset group of the one or more Coreset groups, decoding the information.

In an additional aspect of the disclosure, an apparatus for configuring a transmission to a UE is provided. The apparatus can include one or more processor configured to determine a plurality of Coresets, and group the plurality of Coresets into one or more Coreset groups. Each of the one or more Coreset groups can include a primary Coreset and zero or more secondary Coresets. The one or more processors can also be configured to configure a UE to monitor one or more Coresets for at least one of the one or more Coreset groups for control information. The apparatus can also include a memory coupled to the one or more processors.

In an additional aspect of the disclosure, an apparatus for configuring a resource reuse configuration of a transmission that includes one or more Coresets is provided. The apparatus can include one or more processors configured to determine a resource reuse configuration for a transmission that includes one or more Coresets. The resource reuse configuration can indicate a scheme for utilizing unused resources in the one or more Coresets for data transmission. The one or more processors can also be configured to communicate the resource reuse configuration for the transmission of data to the UE. The apparatus can also include a memory coupled to the one or more processors.

In an additional aspect of the disclosure, an apparatus for receiving information is provided. The apparatus can include one or more processors configured to receive information identifying one or more Coreset groups. Each of the one or more Coreset groups can include a primary Coreset and zero or more secondary Coresets. The one or more processors can also be configured to monitor a transmission to detect at least one Coreset group of the one or more Coreset groups, and receive information via the at least one Coreset group in response to detecting the at least one Coreset group of the one or more Coreset groups in the transmission. The apparatus can also include a memory coupled to the one or more processors.

In an additional aspect of the disclosure, an apparatus for configuring a transmission to a UE is provided. The apparatus can include means for determining a plurality of Coresets and means for grouping the plurality of Coresets into one or more Coreset groups. Each of the one or more Coreset groups can include a primary Coreset and zero or more secondary Coresets. The apparatus can also include means for configuring a UE to monitor one or more Coresets for at least one of the one or more Coreset groups for control information.

In an additional aspect of the disclosure, an apparatus for configuring a resource reuse configuration for a transmission that includes one or more Coresets is provided. The apparatus can include means for determining a resource reuse configuration for a transmission that includes one or more Coresets. The resource reuse configuration can indicate a scheme for utilizing unused resources in the one or more Coresets for data transmission. The apparatus can also include means for communicating the resource reuse configuration for the transmission of data to the UE.

In an additional aspect of the disclosure, an apparatus for receiving information is provided. The apparatus can include means for receiving, at a UE, information identifying one or more Coreset groups. Each of the one or more Coreset groups can include a primary Coreset and zero or more secondary Coresets. The apparatus can also include means for monitoring a transmission to detect at least one Coreset group of the one or more Coreset groups, and means for receiving information in response to detecting the at least one Coreset group.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 7 is a flow diagram illustrating aspects of a method for configuring a transmission utilizing Coreset groups in accordance with embodiments;

FIG. 8 is a flow diagram illustrating aspects of a method for receiving data from a transmission utilizing Coreset groups in accordance with embodiments.

DETAILED DESCRIPTION

Figure 1:
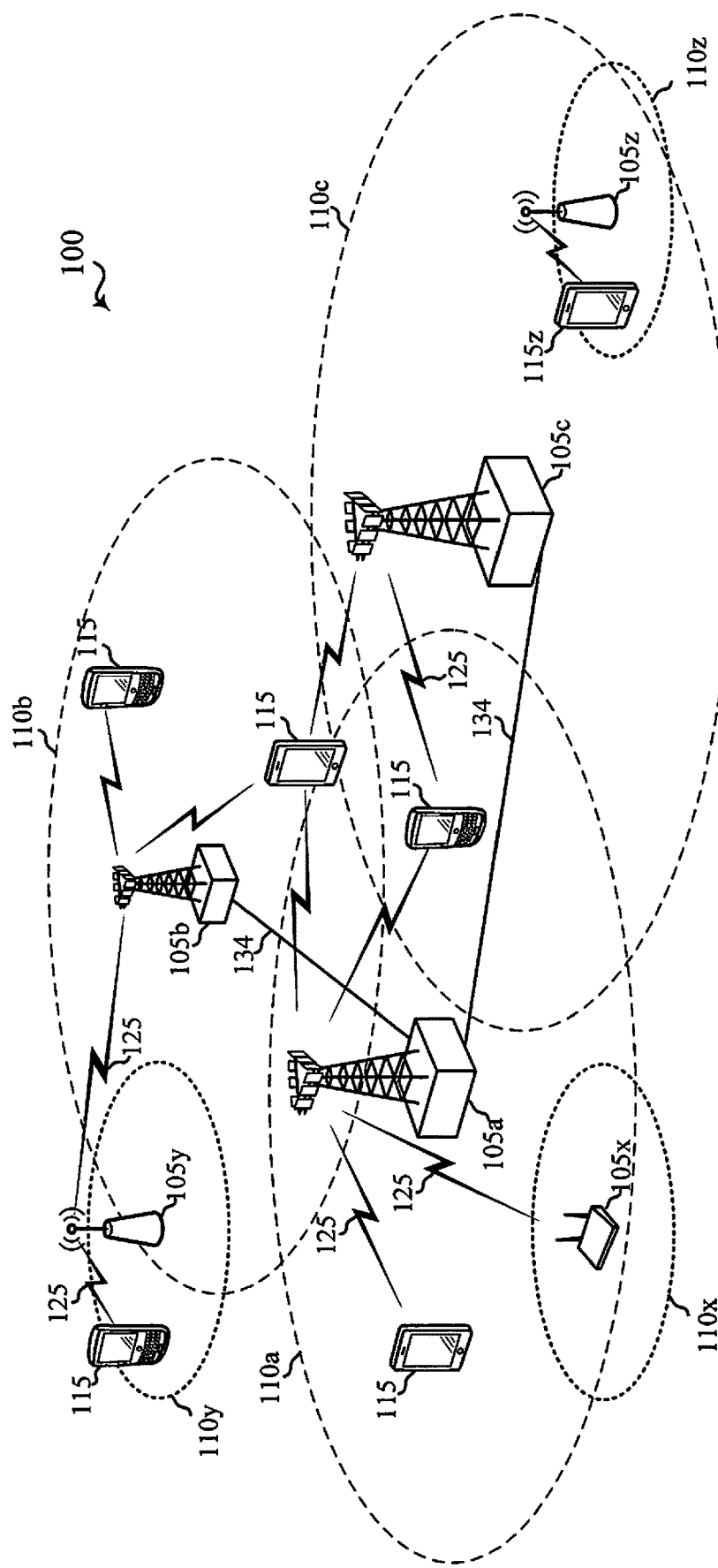
FIG. 1 is a block diagram illustrating details of a wireless communication system according to some embodiments of the present disclosure.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, GSM networks, as well as other communications networks. As described herein, the terms "networks" and "systems" may be used interchangeably according to the particular context.

A CDMA network, for example, may implement a radio technology such as universal terrestrial radio access (UTRA), CDMA2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communications (GSM). An organization named "3rd Generation Partnership Project" (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or UEs. A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATS) and RANs.

An OFDMA network may, for example, implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided by 3GPP, and CDMA2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below. But the description is not intended to be limited to LTE applications. Indeed, the present disclosure is concerned with shared access to wireless spectrum between networks using different radio access technologies or radio air interfaces.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily include a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) new radio (NR) networks. As appreciated by those skilled in the art, components appearing in FIG. 1 are likely to have related counterparts in other network arrangements.

Turning back to FIG. 1, wireless network 100 includes a number of base stations, such as may comprise next generation node Bs (gNB), referred to herein as gNBs 105 and other network entities. A gNB may be a station that communicates with the UEs and may also be referred to as a base station, a node B, an access point, and the like. Each gNB 105 may provide communication coverage for a particular geographic area. In 3GPP, the term "cell" can refer to this particular geographic coverage area of an gNB and/or a gNB subsystem serving the coverage area, depending on the context in which the term is used. In implementations of wireless network 100 herein, gNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

A gNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. In the example shown in FIG. 1, gNBs 105a, 105b and 105c are macro gNBs for the macro cells 110a, 110b and 110c, respectively. gNBs 105x, 105y, and 105z are small cell gNBs, which may include pico or femto gNBs that provide service to small cells 110x, 110y, and 110z, respectively. A gNB may support one or multiple (e.g., two, three, four, and the like) cells.

Wireless network 100 may support synchronous or asynchronous operation. For synchronous operation, the gNBs may have similar frame timing, and transmissions from different eNBs may be approximately aligned in time. For asynchronous operation, the gNBs may have different frame timing, and transmissions from different eNBs may not be aligned in time.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device; a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop computing device, a personal computer (PC), a notebook, a netbook, a smart book, a tablet computing device, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro gNBs, pico gNBs, femto gNBs, relays, and the like. In FIG. 1, a lightning bolt (e.g., communication links 125) indicates wireless transmissions between a UE and a serving gNB, which is a gNB designated to serve the UE on the downlink and/or uplink, or desired transmission between gNBs. Although backhaul communication 134 is illustrated as wired backhaul communications that may occur between gNBs, it should be appreciated that backhaul communications may additionally or alternatively be provided by wireless communications.

Figure 2:
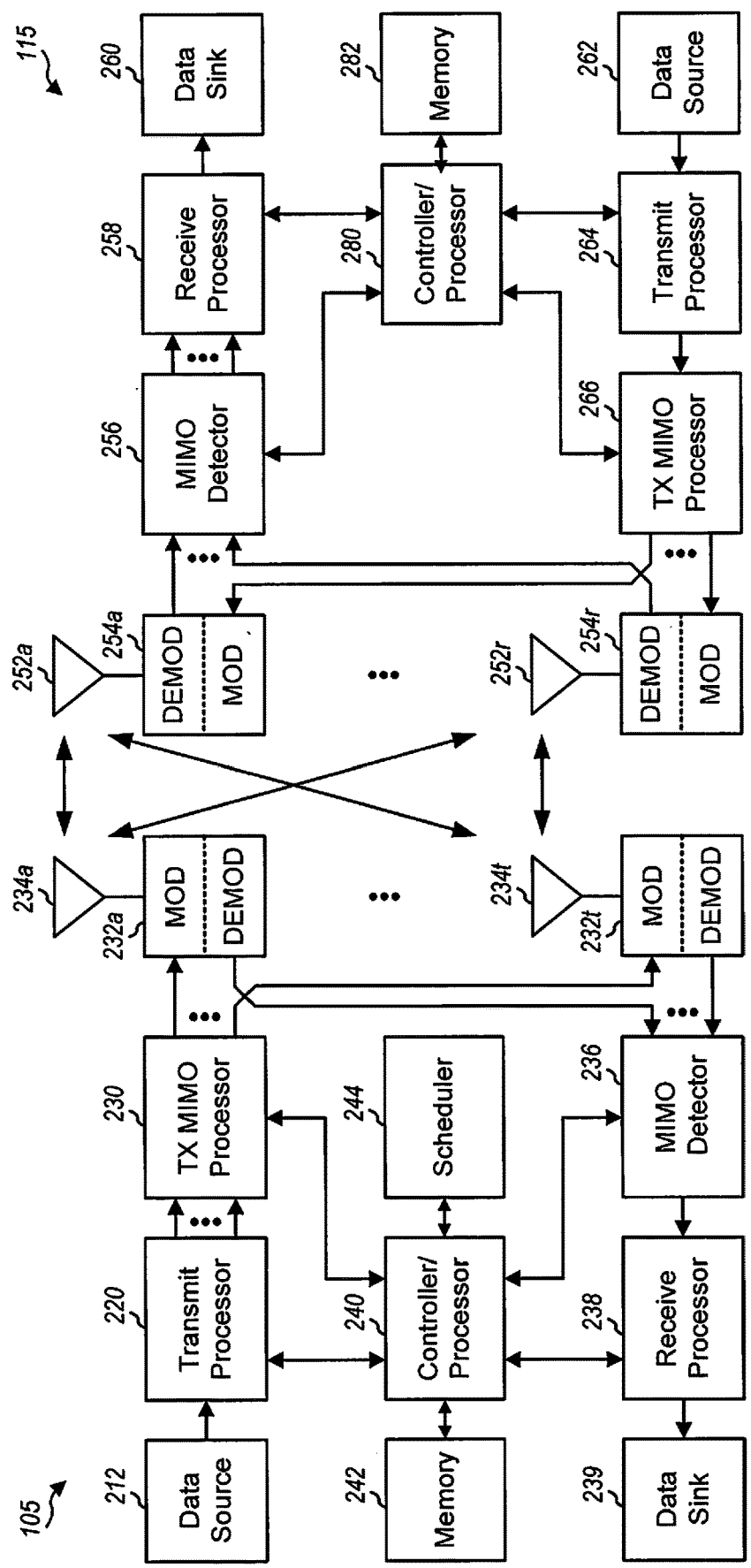
FIG. 2 is a block diagram conceptually illustrating a design of a base station/gNB and a UE configured according to some embodiments of the present disclosure.

FIG. 2 shows a block diagram of a design of base station/gNB 105 and UE 115, which may be one of the base stations/gNBs and one of the UEs in FIG. 1. For a restricted association scenario, the gNB 105 may be small cell gNB 105z in FIG. 1, and UE 115 may be UE 115z, which in order to access small cell gNB 105z, would be included in a list of accessible UEs for small cell gNB 105z. gNB 105 may also be a base station of some other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical control format indicator channel (PCFICH), physical hybrid-ARQ indicator channel (PHICH), physical downlink control channel (PDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS), secondary synchronization signal (SSS), and cell-specific reference signal. Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from eNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at gNB 105 and UE 115, respectively. Controller/processor 240 and/or other processors and modules at gNB 105 may perform or direct the execution of various processes for the techniques described herein. Controllers/processor 280 and/or other processors and modules at UE 115 may also perform or direct the execution of functionality described and illustrated with reference to FIGS. 3-8, and/or other processes for the techniques described herein. Memories 242 and 282 may store data and program codes for gNB 105 and UE 115, respectively. Scheduler 244 may schedule UEs for data transmission on the downlink and/or uplink.

Figure 3:
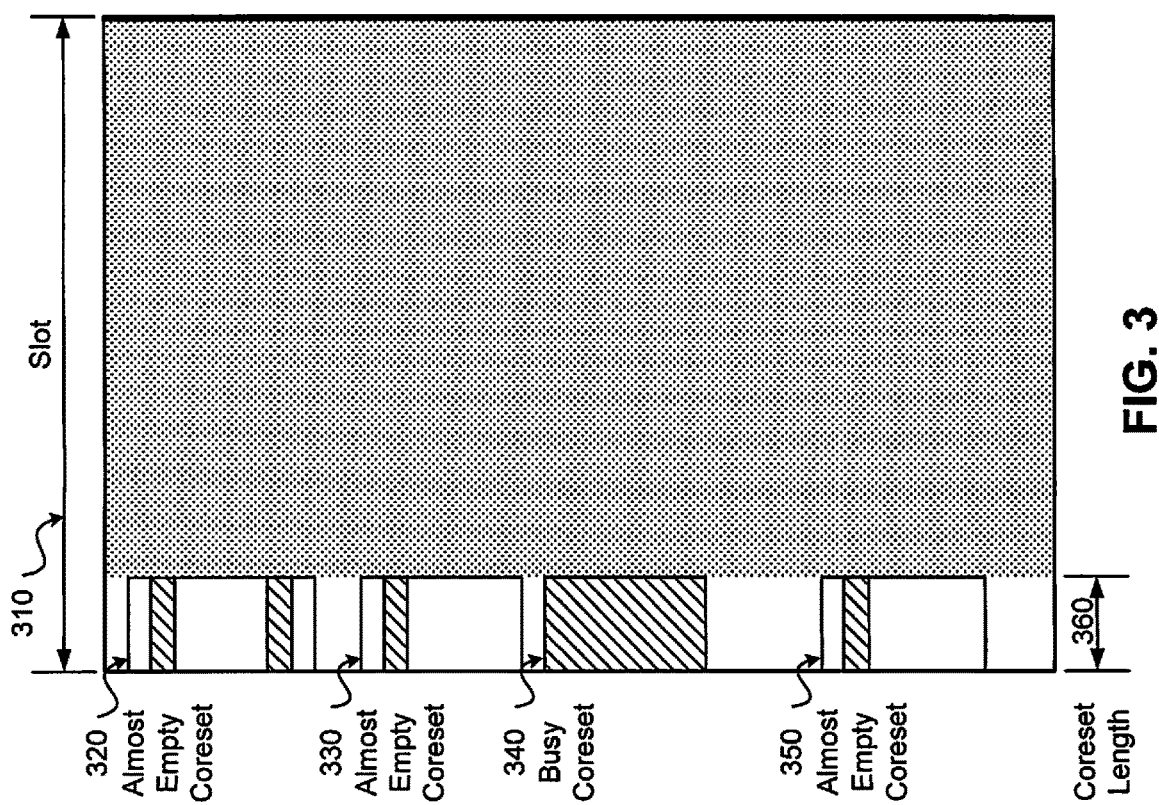
FIG. 3 is a block diagram illustrating aspects of configuring Coresets.

Referring to FIG. 3, a block diagram illustrating aspects of configuring Coresets is shown. For 5G NR-type networks, a Coreset may be utilized in various ways. In FIG. 3, a slot 310 is shown. As illustrated in FIG. 3, within slot 310, a plurality of Coresets have been defined, where the plurality of Coresets includes a first Coreset 320, a second Coreset 330, a third Coreset 340, and a fourth Coreset 350. As illustrated in FIG. 3, the first Coreset 320, the second Coreset 330, and the fourth Coreset 350 may be almost empty (e.g., contain a significant number of unused resources) Coresets, while the third Coreset 340 may be a busy (e.g., contain few or no unused resources, which may be due to a high number of downlink and/or uplink grants, etc.) Coreset. The Coresets may have a Coreset length 360. In embodiments, the Coreset length 360 may correspond to a number of symbols (e.g., one symbol, two symbols, etc.) within the slot that may be utilized by each Coreset. The Coresets may be designed for transmission of common physical downlink control channel (PDCCH) information and may be utilized to carry a slot type indicator, control format indicator (CFI) information (e.g., information that indicates a number of symbols used to carry the Coresets), other types of information (e.g., downlink control indicator (DCI) information, etc.), or a combination thereof. The slot type indicator may be common across all Coresets. In embodiments, the CFI may be different across the Coresets.

If different CFI information is used for different Coresets, the common PDCCH may need to be transmitted in each Coreset. However, processing such a transmission may be expensive. Further, if a single CFI is used, the CFI may be the worst case across all Coresets. The blind decoding savings from having a single CFI indication may not provide much benefit as it prevents narrow band monitoring for UEs, which in turn increases power consumption by the UEs.

As an alternative to such wideband transmission of Coresets, a narrow band monitoring concept may be used by the UE to monitor a narrow radio frequency band. For example, a UE may monitor a UE specific Coreset only. However, if common PDCCH is transmitted in the common Coreset only, to monitor this channel, the UE may need to have a wideband to cover this Coreset and its own UE specific Coreset. Such a use case may not truly provide narrow band monitoring and power consumption of the UE may not be satisfactory.

Further, one use case for the common PDCCH is the slot type indicator for the neighbor UE to detect. If the neighbor UE is in a UE specific Coreset, to monitor a neighbor gNB common Coreset, the UE may need to operate in wideband mode, which may remove the benefit of using narrow band radio frequencies.

As shown above, each of the aforementioned use cases presents contradicting needs. For some use cases it may be beneficial to have common PDCCH in each Coreset, repeat the slot type indicator, and use per Coreset CFI. For other use cases, it may be beneficial to have single common PDCCH in the common Coreset only, which may reduce the control overhead.

Figure 4:
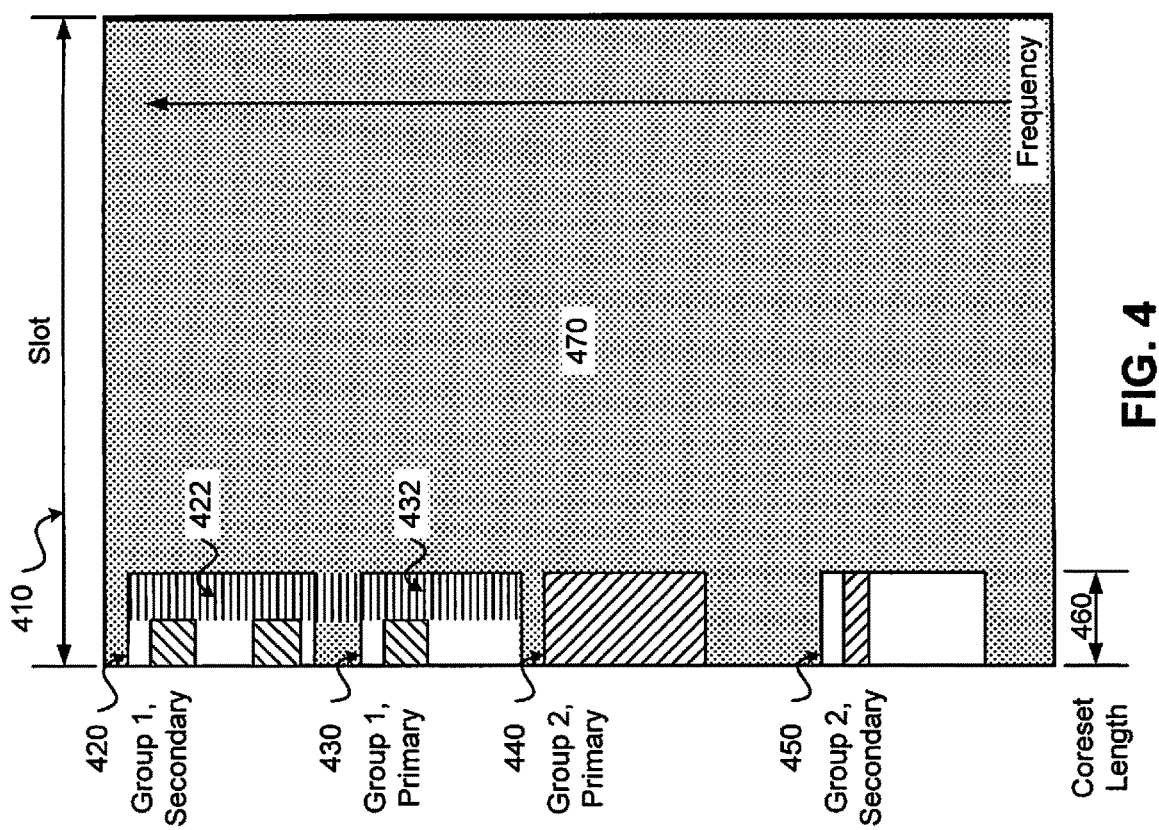
FIG. 4 is a block diagram illustrating aspects of configuring Coreset groups in accordance with embodiments.

FIG. 4 is a block diagram illustrating aspects of configuring Coreset groups in accordance with an embodiment. A solution to the aforementioned contradicting needs may be realized by defining Coreset groups. In FIG. 4, a slot 410 is shown. As shown in FIG. 4, a plurality of Coresets may be defined. The plurality of Coresets may include a first Coreset 420, a second Coreset 430, a third Coreset 440 and a fourth Coreset 450. The plurality of Coresets may be grouped to form one or more Coreset groups. For example, in FIG. 4, the first Coreset 420 and the second Coreset 430 may form a first Coreset group and the third Coreset 440 and the fourth Coreset 450 may form a second Coreset group. The Coresets may have a Coreset length 460.

In embodiments, the Coreset length 460 may correspond to a number of symbols (e.g., one symbol, two symbols, etc.) within the slot that may be utilized by each Coreset. In varying embodiments, different Coresets and/or Coreset groups may utilize different numbers of symbols. For example, the first Coreset 420 and the second Coreset 430 may utilize one symbol, leaving one unused symbol within the first Coreset 420 and the second Coreset 430, and the third Coreset 440 and the fourth Coreset 450 may utilize two symbols, leaving no unused symbols within the third Coreset 440 and the fourth Coreset 450. It is noted that some resources of the symbols associated with the Coreset length 460 may not be included in a Coreset. In embodiments, these unused resources may include subcarriers within the symbols corresponding to the symbols utilized by the plurality of Coresets. The quantity of unused resources within the symbols associated with the Coreset length 460, as well as their positions (e.g., frequencies) within the slot may vary depending on a particular configuration of the slot 410 and its Coresets.

To facilitate narrow band monitoring of the Coreset groups, the Coresets within a Coreset group may be localized in frequency domain. For example, in FIG. 4, the first Coreset group includes the first Coreset 420 and the second Coreset 430, and the second Coreset group includes the third Coreset 440 and the fourth Coreset 450. As shown in FIG. 4, the first Coreset 420 and the second Coreset 430 (e.g., the first Coreset group) are positioned relatively close to each other with respect to their frequencies. That is to say that forming the first Coreset group using the first Coreset 420 and the second Coreset 430 localizes the first Coreset 420 and the second Coreset 430 to a narrower band of frequencies than if the first Coreset group was formed using the first Coreset 420 and the third Coreset 440 or using the first Coreset 420 and the fourth Coreset 450. Thus, a UE that is to monitor the first Coreset group or the second Coreset group may utilize a narrow band monitoring technique, thereby reducing power consumption of the UE. For example, if a transmission spans a frequency spectrum of 100 MHz, narrow band monitoring may facilitate monitoring 20 MHz out of the 100 MHz utilized by the transmission. It is noted, however, that this example has been provided for purposes of illustration, rather than by way of limitation, and that narrow band monitoring may utilize a larger or smaller portion of the frequency spectrum depending on various factors, such as traffic load, subcarrier configurations, and other factors. To illustrate, depending on the traffic load, a UE may sometimes utilize wide band monitoring, such as 100 MHz.

Additional improvements may also be realized by configuring Coreset groups in accordance with embodiments. For example, in embodiments, each Coreset group may be configured to include a primary Coreset and at least one secondary Coreset. As shown in FIG. 4, the first Coreset group includes the second Coreset 430 as a primary Coreset and the first Coreset 420 as a secondary Coreset, and the second Coreset group includes the third Coreset 440 as a primary Coreset and the fourth Coreset 450 as a secondary Coreset. It is noted that although FIG. 4 only illustrates Coreset groups that include a single secondary Coreset, in embodiments, a Coreset group may be defined that includes two or more secondary Coresets. In embodiments, the primary Coreset of a particular Coreset group may be configured to provide a common search space for UEs configured for the particular Coreset, and the secondary Coreset may be configured to provide a UE specific search space for UEs configured for the particular Coreset. In embodiments, common PDCCH may be transmitted in the primary Coreset of one or more Coreset groups, and may not be transmitted in the secondary Coresets. In embodiments, radio resource control (RRC) signaling may be utilized to signal the configuration of the Coreset group assigned to the UE. From the UE's perspective, it only needs to monitor the Coresets within the Coreset Group for which its configured, which includes monitoring only one primary Coreset.

In embodiments, CFI information may be common across all Coresets in a Coreset group. For example, CFI information for the first Coreset group may be common to both the first Coreset 420 and the second Coreset 430, and CFI information for the second Coreset group may be common to both the third Coreset 440 and the fourth Coreset 450. It is noted that in some embodiments, the CFI information may be the same for all Coreset groups, while, in other embodiments, the CFI information for different Coreset groups may be different. For example, as shown in FIG. 4, the first Coreset group may utilize one symbol and the second Coreset group may utilize two symbols. Thus, when the CFI presents a worst case scenario within a Coreset group, in general, it may not be as bad as the worst case over all Coresets.

Defining Coreset groups that include a primary Coreset and at least one secondary Coreset may provide power savings, although the power savings may not be as much as covering a single UE specific Coreset only. However, the power savings may still be better than would otherwise be realized if the UE had to monitor a UE specific Coreset and a common Coreset, as described with reference to FIG. 3 above.

For neighbor cell monitoring, RRC signaling may be utilized to notify the UE of one or more Coresets of a neighbor cell. For example, in embodiments, a list of primary Coresets may be provided to the UE by a serving cell. The UE may then pick a primary Coreset of the neighbor cell that is close to its own monitored Coreset(s), thereby enabling the UE to utilize a relatively narrow band to monitor its own Coreset(s) and the primary Coreset of the neighbor cell (e.g., a cell provided by a neighbor gNB). In some embodiments, the gNB may select the best primary Coreset of neighbor gNB and inform the UE of the selected primary Coreset of the neighbor gNB, rather than sending a list of primary Coresets for the neighbor gNB to the UE. In embodiments, the gNBs of the network may coordinate to have the same primary Coresets, which may prevent bandwidth increases when monitoring neighbor gNBs. Using narrow band monitoring facilitated by embodiments may enable power saving to be achieved at the UE. Additionally, exchanging Coreset configuration information between gNBs may facilitate interference mitigation between neighboring gNBs. In embodiments, the Coreset configuration information between neighbor gNBs may include information that indicates a slot format utilized by a particular gNB.

As shown above, configuring Coreset groups in accordance with embodiments may provide several advantages. First, the UE only needs to monitor the primary Coreset and its own UE specific Coreset (e.g., the secondary Coreset). Second, by localizing the Coresets within a Coreset group in the frequency domain, the UE may monitor a narrower bandwidth, reducing power consumption at the UE. Third, configuring each Coreset group to include a primary Coreset over which common PDCCH information may be transmitted effectively provides a use case scenario where the common PDCCH information is transmitted in each Coreset. Stated another way, embodiments achieve a compromise that provides excellent power savings while effectively maintaining a large common PDCCH. In some embodiments, one or more Coreset groups may include a primary Coreset only (e.g., a Coreset group that does not include a secondary Coreset). This may not provide power savings, but may provide for the smallest common PDCCH overhead.

As briefly explained above, a UE may be RRC configured to know about all Coresets that the gNB is using, together with the Coreset group structure, although the UE may only need to monitor the Coreset it is configured to use. For a resource (e.g., a resource element of the slot 410) not included in one of the Coresets, if it is included in the resource allocation of the UE, the physical downlink shared channel (PDSCH) may start from symbol 0 of slot 410. In embodiments, unused PDCCH resources in Coresets may be reused. For example, unused PDCCH resources may be reused for PDSCH. In embodiments, a DCI for downlink grant may include a field to indicate the Coreset resource reuse, and an RRC configuration may be used to enable/disable this feature.

In FIG. 4, a first illustrative embodiment of a resource reuse configuration according to the present disclosure is shown. In particular, resources 470, which have been shaded, include resources that are not in any of the plurality of Coresets and resources on empty symbols within each Coreset. For example, only the first symbol may be used within the first Coreset group (e.g., the first Coreset 420 and the second Coreset 430), allowing the resources 422 within the second symbol of the first Coreset 420 and the resources 432 within the second symbol of the second Coreset 430 to be reused. In an embodiment, a field may be included in, or added to, the DCI information for a downlink grant to indicate the Coreset reuse configuration. In embodiments, the field may include one sub-field for each Coreset group. This may require more bits when there are more Coreset groups configured. It is noted that when each Coreset group has the same CFI, one value for each Coreset group may be used to indicate whether unused symbols within a Coreset group are reusable.

In embodiments, the contents of the sub-field may have various values, each value indicating a reuse configuration. For example, a first value may indicate that no symbols of the Coreset or Coreset group are used for control information, a second value may indicate that one symbol of the Coreset or Coreset group is used for control information, and a third value may indicate that the full Coreset length of the Coreset or Coreset group is used for control information. This may enable the UE to determine whether unused symbols within a Coreset or Coreset group are present and reusable. In embodiments, the sub-fields may be independently coded for each Coreset group.

In embodiments, another combination (e.g., field value) may indicate that only the group common PDCCH is transmitted in the Coreset group, allowing resource reuse at the sub-Coreset level. For this special case, there may be no PDCCH transmission across the entire Coreset group (e.g., including primary and secondary Coresets within the Coreset group), and only the group common PDCCH may be included in the first symbol. This enables the PDSCH of the UE to start from the first symbol in the control information, and the UE may only need to rate match around the group common PDCCH and the demodulation reference signal (DMRS) for the group common PDCCH.

In embodiments, a single field may be used for all Coreset groups covered by the UE's resource allocation. This may reduce the amount of overhead associated with the control information. However, in such a scenario, resource reuse may not be optimum as this common field needs to be the worst case of all Coreset groups monitored by the UE.

As explained above, FIG. 4 illustrates an embodiment of a resource reuse configuration that may be provided using one reuse field per Coreset. As shown in FIG. 4, in such an embodiment, the resource reuse field may indicate that all resources not included in any Coresets (e.g., resources 470) may be reused and, within each Coreset, resources associated with empty symbols (e.g., resources 422, 432) may be reused. It is noted that for the resources included in the second Coreset group (e.g., the Coreset group that includes the third Coreset 440 and the fourth Coreset 450), no resources may be reused. This is due to the control information being carried over the full Coreset length 460 (e.g., two symbols are used to carry control information).

In embodiments, a gNB (e.g., one of the gNBs 105 illustrated and described with respect to FIG. 1 or FIG. 2) may determine a resource reuse configuration for a transmission. The resource reuse configuration may indicate a scheme for utilizing or reusing unused resources of the transmission (e.g., for PDSCH etc.). In embodiments, the gNB may communicate the resource reuse configuration for the transmission to the UE. This may include configuring one or more fields of the control information included in the transmission, as described above. As explained above, in FIG. 4, the scheme for utilizing or reusing unused resources of the transmission may indicate that resources that are not assigned to the one or more Coreset groups, such as the resources 470, are reusable. Additionally, the scheme for utilizing or reusing unused resources of the transmission may indicate that resources within each Coreset associated with empty symbols (e.g., resources 422, 432) may be reused. In embodiments, the gNB may determine the resource reuse configuration based at least in part on one or more Coreset group configurations associated with a neighbor cell. This may mitigate interference for transmissions by the gNB and/or the neighbor gNB providing the neighbor cell. As shown above, configuring Coreset groups in accordance with embodiments may facilitate narrow band monitoring of Coresets by UEs, which reduces power consumption, and may provide a mechanism for providing a common PDCCH. Further, embodiments facilitate dynamic configuration of resource reuse configurations/schemes that may be tailored to each Coreset group, thereby improving bandwidth utilization.

Figure 5:
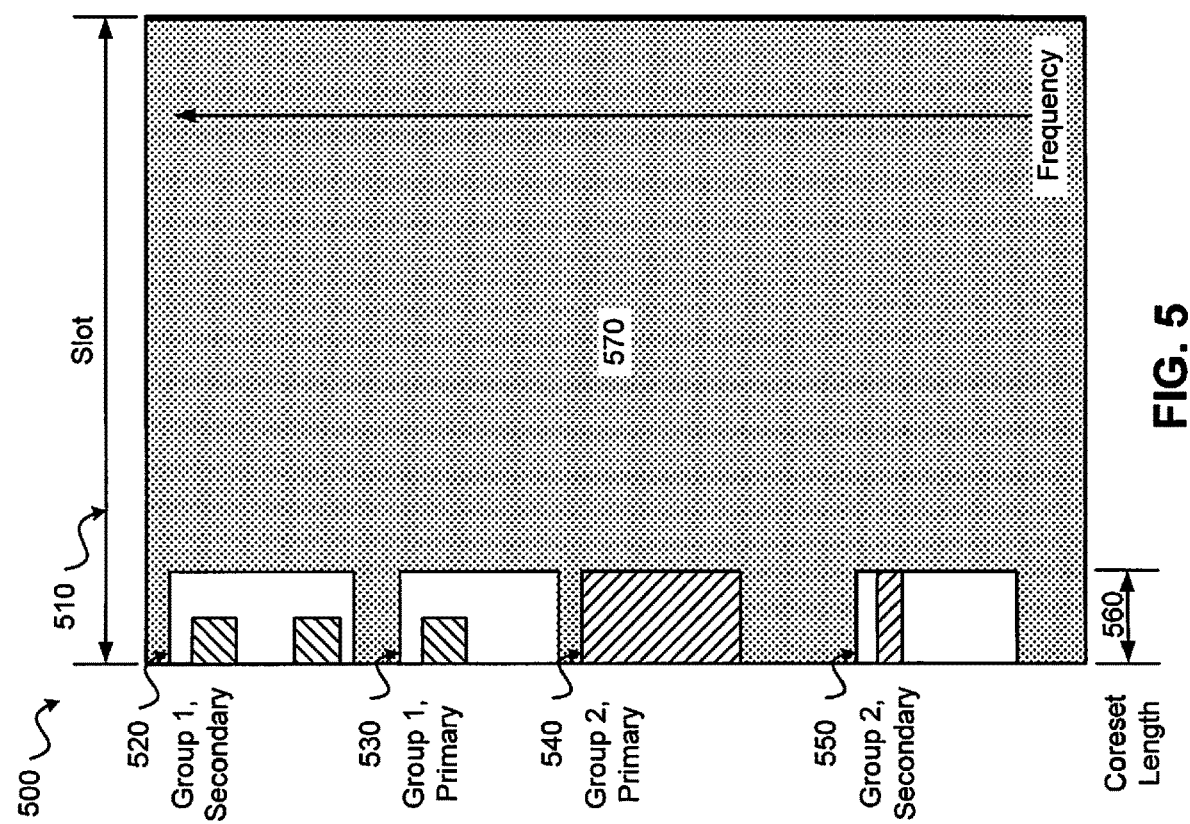
FIG. 5 is a block diagram illustrating aspects of configuring Coreset groups for resource reuse in accordance with embodiments.

Referring to FIG. 5, a block diagram illustrating aspects of configuring Coreset groups for resource reuse in accordance with embodiments is shown. As described above, a plurality of Coresets may be defined. As shown in the example illustrated in FIG. 5, a plurality of defined Coresets may include a first Coreset 520, a second Coreset 530, a third Coreset 540 and a fourth Coreset 550. The plurality of Coresets may be grouped to form one or more Coreset groups. For example, in FIG. 5, the first Coreset 520 and the second Coreset 530 may form a first Coreset group and the third Coreset 540 and the fourth Coreset 550 may form a second Coreset group. The Coresets may have a Coreset length 560. In embodiments, the Coreset length 560 may correspond to a number of symbols (e.g., one symbol, two symbols, etc.) within the slot 510 that are utilized to provide the Coreset. In embodiments, different Coresets and/or Coreset groups may utilize different numbers of symbols. For example, the first Coreset 520 and the second Coreset 530 may utilize one symbol, leaving one unused symbol within the first Coreset 520 and the second Coreset 530, and the third Coreset 540 and the fourth Coreset 550 may utilize two symbols, leaving no unused symbols within the third Coreset 540 and the fourth Coreset 550. It is noted that some resources of the symbols associated with the Coreset length 560 may not be included in a Coreset. In embodiments, these unused resources may include subcarriers within the symbols utilized by the plurality of Coresets. The quantity of unused resources within the symbols associated with the Coreset length 560, as well as their positions (e.g., frequencies) within the slot 510 may vary depending on a particular configuration of the slot 510 and its Coresets.

In FIG. 5, an illustrative embodiment of a particular resource reuse configuration is shown. In particular, the resource reuse configuration illustrated in FIG. 5 indicates that all resources that are not included any Coresets may be reused. For example, in slot 510, resources 570, which have been shaded, illustrate the resources that are not included in any Coresets. Each of the resources 570 may be reused, such as for PDSCH or for other purposes. Further, as shown in FIG. 5, the empty symbols within a Coreset may not be reused. Thus, in FIG. 5, a scheme for utilizing unused resources of the transmission may indicate that resources not assigned to any Coresets and/or Coreset groups may be reusable, and that resources associated with empty symbols within the one or more Coreset groups are not reusable. In embodiments, the resource reuse configuration illustrated in FIG. 5 may be utilized in scenarios where a UE has a wideband assignment, such as when the UE is configured to monitor multiple Coresets and/or Coreset groups spanning a wide frequency range, where at least one of the Coresets and/or Coreset groups utilizes two (2) symbols. In such scenarios the reuse field included in the DCI may only include one sub-field for indicating the reuse configuration for the Coresets and/or Coreset groups monitored by the UE. When only one sub-field is used, there may be no way to indicate to the UE that there are empty symbols in the other Coresets and/or Coreset groups, which prevents reuse of the unused symbols. In embodiments, one or more resource reuse fields may be utilized to indicate the resource reuse configuration for the slot 510, as described above with reference to FIG. 4.

Figure 6:
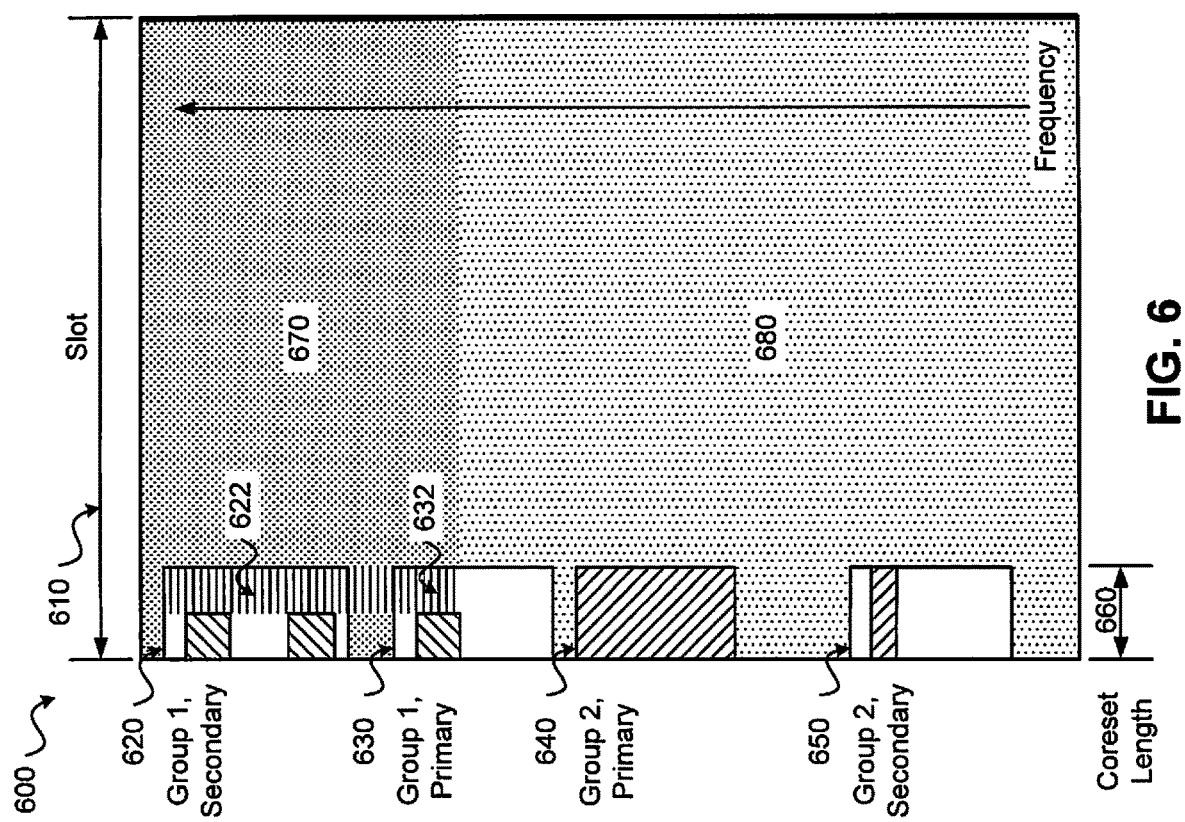
FIG. 6 is a block diagram illustrating additional aspects of configuring Coreset groups for resource reuse in accordance with embodiments.

Referring to FIG. 6, a block diagram illustrating additional aspects of configuring Coreset groups for resource reuse in accordance with embodiments is shown. As shown in FIG. 6, a plurality of Coresets may be defined. The plurality of Coresets may include a first Coreset 620, a second Coreset 630, a third Coreset 640 and a fourth Coreset 650. The plurality of Coresets may be grouped to form one or more Coreset groups. For example, in FIG. 6, the first Coreset 620 and the second Coreset 630 may form a first Coreset group and the third Coreset 640 and the fourth Coreset 650 may form a second Coreset group. The Coresets may have a Coreset length 660. In embodiments, the Coreset length 660 may correspond to a number of symbols (e.g., one symbol, two symbols, etc.) within the slot 610 that are utilized to provide the Coreset. In embodiments different Coresets and/or Coreset groups may utilize different numbers of symbols. For example, the first Coreset 620 and the second Coreset 630 may utilize one symbol, leaving one unused symbol within the first Coreset 620 and the second Coreset 630, and the third Coreset 640 and the fourth Coreset 650 may utilize two symbols, leaving no unused symbols within the third Coreset 640 and the fourth Coreset 650. It is noted that some resources of the symbols associated with the Coreset length 660 may not be included in a Coreset. In embodiments, these unused resources may include subcarriers within the symbols utilized by the plurality of Coresets. The quantity of unused resources within the symbols associated with the Coreset length 660, as well as their positions (e.g., frequencies) within the slot 610 may vary depending on a particular configuration of the slot 610 and its Coresets.

In FIG. 6, another illustrative embodiment of a particular resource reuse configuration is shown. In particular, the resource reuse configuration illustrating in FIG. 6 indicates that all resources that are not included any Coresets may be reused. For example, in slot 610, resources 670 and 680, which have been shaded using different patterns of small dots, illustrate the resources that are not included in any Coresets. Each of the resources 670, 680 may be reused, such as for PDSCH or for other purposes. Further, as shown in FIG. 6, the empty symbols within a Coreset or Coreset group may be reused. Thus, in FIG. 6, a scheme for utilizing unused resources of the transmission may indicate that resources not assigned to any Coresets and/or Coreset groups (e.g., resources 670, 680) may be reusable, and that resources associated with empty symbols within the one or more Coreset groups (e.g., resources 622, 632) are reusable.

Further, FIG. 6 illustrates that the reusable resources may be configured to facilitate narrow band use by a UE. For example, the resources 622, 632, 670 may be allocated for reuse by UEs configured to monitor the first Coreset group (e.g., the first Coreset 620 and the second Coreset 630), and the resources 680 may be allocated for reuse by UEs configured to monitor the second Coreset group (e.g., the third Coreset 640 and the fourth Coreset 650). Such a resource reuse configuration further facilitates narrow band use by the UEs by localizing the reusable resources to frequencies near the frequencies monitored for the configured Coreset group(s). In some scenarios or deployments, the resources not included in any Coresets may be allocated unevenly. For example, a portion of the unused resources 680 are associated with frequencies utilized by the second Coreset 630, although reuse of such resources and frequencies is facilitated on symbols that are not utilized by second Coreset 630. In embodiments, one or more resource reuse fields may be utilized to indicate the resource reuse configuration(s) for the slot 610, as described above with reference to FIG. 4. It is noted that the particular resource reuse configurations or schemes illustrated in FIGS. 4-6 are provided for purposes of illustrating aspects of utilizing Coreset groups, rather than by way of limitation, and therefore should not be construed as limiting the present disclosure to the specific resource reuse configurations illustrated herein.

As described above, for transmission schemes utilizing carrier aggregation techniques, at least one Coreset group of the one or more Coreset groups may comprise a primary Coreset transmitted over a first carrier and a secondary Coreset transmitted over a second carrier. In embodiments, the primary Coreset may be transmitted over the first carrier by a serving base station (e.g., a serving gNB) and the secondary Coreset may be transmitted over the second carrier by a second base station (e.g., a neighboring gNB). Further, it is noted that in some embodiments, a cell identifier for the primary Coreset and the secondary Coreset within a Coreset group may be the same cell identifier, while in other embodiments, the cell identifier for the primary Coreset may be different from the cell identifier for the secondary Coreset (e.g., when the primary and secondary Coresets are transmitted by different gNBs, for example).

Utilizing aspects of the embodiments illustrated with reference to FIGS. 4-6, a gNB may transmit control information (e.g., DCI, CFI, etc.) to a UE. In some embodiments, the gNB may transmit information associated with one or more Coresets corresponding to a neighbor cell to the UE, as described above. This may facilitate mitigation of interference between neighbor cells. As described above, the information associated with the one or more Coresets corresponding to a neighbor cell may comprise a list of primary (and possibly secondary) Coresets and Coreset configuration information for each identified Coreset of the list. A UE may receive the list and select one or more Coresets of the neighbor cell for monitoring. The one or more Coresets of the neighbor cell may be selected based on whether they facilitate a narrow band monitoring. For example, the UE may select a Coreset that is nearer to the Coresets of the primary cell serving the UE in terms of frequency, thereby minimizing the range of frequencies monitored by the UE, resulting in reduced power consumption by the UE. In other embodiments, the primary cell may select the Coreset(s) of the neighbor cell that is most closely localized to the Coresets configured for the UE (e.g., Coresets of the primary cell), and communicate information associated with the Coreset(s) identified by the primary cell to the UE. To facilitate such functionality, neighbor cells may share Coreset configuration information with each other (e.g., via a backhaul communication link, etc.).

As illustrated in FIGS. 3-6, each Coreset may include a set of resource elements. For example, for each Coreset within a slot (e.g., slot 310 of FIG. 3, slot 410 of FIG. 4, slot 510 of FIG. 5, and slot 610 of FIG. 6), the resource elements corresponding to subcarriers and symbols allocated to a Coreset may form a resource set. Additionally, where one or more Coresets are arranged into a Coreset group, the resource elements allocated to those Coresets, or at least those resource elements allocated for data transmissions (e.g., PDCCH data transmissions, PDSCH data transmissions, etc.) within those Coresets may form a group of resource sets. Thus, each Coreset may include a resource set, and a group of Coresets may include a resource set group.

Referring to FIG. 7, a flow diagram illustrating aspects of a method for configuring a transmission utilizing Coreset groups in accordance with embodiments is shown as a method 700. In embodiments, the method 700 may be stored as instructions at a computer-readable medium. The instructions, when executed by one or more processors (e.g., one or more of the processors of the gNBs 105 described and illustrated with respect to FIGS. 1 and 2), may cause the one or more processors to perform operations for configuring a transmission utilizing Coreset groups in accordance with embodiments, as described above with respect to FIGS. 4-6, and as described in more detail below.

At 710, the method 700 includes determining a plurality of Coresets, and, at 720, grouping the plurality of Coresets into one or more Coreset groups. As described above with respect to FIGS. 4-6, each of the one or more Coreset groups may include a primary Coreset and zero or more secondary Coresets. It is noted that some embodiments may establish a plurality of Coreset groups where a particular Coreset group does not include a secondary Coreset, although other Coreset groups may include one or more secondary Coresets.

In embodiments, grouping the plurality of Coresets into one or more Coreset groups, at 720, may further include, at 722, localizing a primary Coreset and a secondary Coreset of a Coreset group in a frequency domain of the transmission. For example, when two Coreset groups are defined by the base station, each including a primary Coreset and a secondary Coreset, the primary Coreset and the secondary Coreset of the first Coreset group may be localized in the frequency domain of the transmission, and the primary Coreset and the secondary Coreset of the second Coreset group may be in a different portion of the frequency domain of the transmission.

As explained above, localizing the Coreset groups may facilitate narrow band monitoring of transmissions (e.g., transmissions from one or more base stations) by UEs configured for a particular Coreset group. Further, in embodiments, for each of the one or more Coreset groups, the primary Coreset may provide a common search space and the secondary Coreset may provide a UE specific search space. As explained above, this may give the effect of sending a common PDCCH. In some embodiments, the method 700 may further include determining, by a base station, a resource reuse configuration for the transmission. As explained herein with respect to FIGS. 4-6 and 9, the resource reuse configuration may indicate a scheme for utilizing unused resources of the transmission. The resource reuse configuration may be communicated to the UE by a base station. For example, in embodiments, the resource reuse configuration may be communicated to the UE using a resource reuse field (and one or more sub-fields) included in control information (e.g., DCI) transmitted by a base station, as described above.

In embodiments, the scheme for utilizing unused resources of the transmission may indicate that resources that are not assigned to the one or more Coreset groups are reusable. For example, in FIG. 4, the reusable resources that are not assigned to the one or more Coreset groups may correspond to the resources 470. In embodiments, the scheme for utilizing unused resources of the transmission may further indicate that resources associated with empty symbols within the one or more Coreset groups are reusable. For example, reusable resources associated with empty symbols within the one or more Coreset groups may include the resources 422, 432 of FIG. 4, or the resources 622, 632 of FIG. 6. In some embodiments, resource reuse configurations may be separately determined for each Coreset group. For example, a first Coreset group may have a first scheme for utilizing unused resources of the transmission and a second Coreset group may have a second scheme for utilizing unused resources of the transmission, where the first scheme and the second scheme are different. This is illustrated in FIG. 6, where the resources 622, 632 670 are available for reuse in connection with UEs monitoring the first Coreset group that includes the first Coreset 620 and the second Coreset 630, and the resources 680 are available for reuse in connection with UEs monitoring the second Coreset group that includes the third Coreset 640 and the fourth Coreset 650. As explained above, this provides a narrow band configuration that enables narrow band monitoring and resource reuse by the UEs configured for each Coreset group. It is noted that unused resources that are reusable may be used to transmit data to the UE using the PDSCH.

At 730, the method 700 includes configuring a UE to monitor one or more Coresets for at least one of the one or more Coreset groups for control information. For example, the control information may include DCI, CFI information for each of the one or more Coreset groups, and other information. The CFI information may indicate a number of symbols used to carry data for each of the Coreset groups. Depending on the particular configuration of the different Coreset groups, the CFI information may be the same for all Coreset groups, or may be different for each Coreset group (e.g., a first Coreset group may be associated with first CFI information and a second Coreset group may be associated with second CFI information). For example, in some configurations, the number of symbols used to carry the control data in each of the Coreset groups may be the same (e.g., both a first Coreset group and a second Coreset group may carry control information over the same number of symbols). In other configurations of Coreset groups, the number of symbols used to carry the control data in each of the Coreset groups may be different (e.g., a first Coreset group may carry control information over a first number of symbols, such as a single symbol, and a second Coreset group may carry control information over the a different number of symbols, such as two symbols, as illustrated in FIGS. 4-6).

In embodiments, a primary Coreset may have a pre-determined configuration and the secondary Coreset(s) may have a dynamically configured transmission configuration. For example, the primary Coreset may be transmitted over a pre-determined frequency range, and the secondary Coreset may have a dynamically determined configuration (e.g., dynamic frequency range) depending on the number of UE specific transmissions and/or data to be included in the secondary Coreset.

In embodiments, the primary Coreset may be transmitted on a first carrier and the secondary Coreset may be transmitted on a second carrier (e.g., for carrier aggregation transmissions). As explained above, when carrier aggregation is utilized, the primary Coreset may be transmitted over a first carrier and the secondary Coreset may be transmitted over a second carrier by a serving base station (e.g., serving gNB). In some embodiments where carrier aggregation schemes are utilized, a primary Coreset may be transmitted over a first carrier by a serving base station (e.g., serving gNB) and a secondary Coreset (or an additional primary Coreset) may be transmitted on a second carrier by a second base station (e.g., a neighboring gNB), as described above. Depending on the number of gNBs transmitting the Coresets, the cell identifier for the primary Coreset and the secondary Coreset may be same, or different, as described above. As explained above, the serving gNB (or possibly the neighboring gNB) may transmit information associated with one or more Coresets transmitted by the neighbor cell to the UE. Further, in embodiments, the serving gNB may transmit information associated with the Coresets and Coreset groups provided by the serving gNB to one or more neighbor gNBs, and may receive information indicating Coresets and Coreset groups provided by the neighboring gNB, as described above.

In embodiments, the method 700 may include determining one or more Coresets corresponding to a neighbor cell, identifying a particular Coreset of the one or more Coresets corresponding to the neighbor cell, the particular Coreset corresponding to a Coreset to be monitored by the UE, and transmitting, to the UE, information associated with the particular Coreset corresponding to the neighbor cell. This may facilitate narrow band monitoring of the particular Coreset of the neighbor cell by the UE, as described above. In embodiments, the particular Coreset may be identified as facilitating narrow band monitoring by the UE. In some embodiments, rather than selecting the Coreset of the neighbor cell for the UE, the method 700 may cause the gNB to transmit a list of Coresets (e.g., primary Coresets) of the neighbor cell to the UE, and the UE may then select the particular Coreset of the neighbor cell to be monitored based on the list and the Coresets configured for the UE by the serving cell/gNB.

As shown above with reference to FIGS. 4-7, the method 700 may enable narrow band monitoring of Coresets by a UE, resulting in reduced power consumption by the UE. Further, resource reuse configurations may be used to provide efficient use of resources that are not utilized to provide control information within transmissions comprising Coresets and Coreset groups. The aforementioned improvements or enhancement provided by the method 700 are described for purposes of illustration, rather than by way of limitation, and additional advantages that may be realized by configuring transmissions using Coresets and Coreset groups in accordance with the method 700 may be readily apparent to a person skill in the art.

Referring to FIG. 8, a flow diagram illustrating aspects of a method for receiving data from a transmission utilizing Coreset groups in accordance with embodiments is shown as a method 800. In embodiments, the method 800 may be stored as instructions at a computer-readable medium. The instructions, when executed by one or more processors (e.g., one or more of the processors of the UE 115 described and illustrated with respect to FIGS. 1 and 2), may cause the one or more processors to perform operations for receiving data from a transmission utilizing Coreset groups in accordance with embodiments, as described above with respect to FIGS. 4-6, and as described in more detail below.

At 810, the method includes receiving, at a UE, information identifying one or more Coreset groups. In embodiments, each of the one or more Coreset groups may include a primary Coreset and zero or more secondary Coresets. In some embodiments, a Coreset group may include a primary Coreset and at least one secondary Coreset. At 820, the method 800 includes monitoring, by the UE, a transmission from a base station to detect at least one Coreset group of the one or more Coreset groups. In embodiments, the UE may be configured to monitor at least one Coreset group included in a transmission having one or more Coreset groups. For transmissions having at least two Coreset groups, the at least two Coreset groups may be transmitted over a wide band of radio frequencies, however, as explained above, the Coreset groups may be configured to enable the UE to perform monitoring over a narrow band of radio frequencies, which may reduce the power consumption of the UE, as described above with respect to FIGS. 4-7. At 830, the method 800 includes, in response to detecting the at least one Coreset group of the one or more Coreset groups, decoding, by the UE, the information included in the at least one Coreset group. In embodiments, the UE may further receive resource reuse configuration information that indicates a scheme for reusing resources of the transmission, as described herein with respect to FIGS. 4-7 and 9.

In embodiments where carrier aggregation is utilized for the transmission, the transmission may be a multicarrier transmission and the UE may monitor a first carrier of the transmission to detect a primary Coreset, and may monitor a second carrier of the transmission to detect a secondary Coreset. In embodiments, information provided via the primary Coreset may be transmitted by a first base station (e.g., a serving gNB), and information provided via the secondary Coreset may be transmitted by a second base station (e.g., a neighbor gNB).

As described above, the primary Coreset may provide a common search space and the secondary Coreset provide a UE specific search space. Further, as explained above, the data provided via the monitored Coreset group may include downlink grant information, uplink grant information, other types of control information, or combination thereof. As explained above, monitoring Coreset groups configured according to embodiments may facilitate reduced power consumption by the UE due to the localization of the UE's configured Coresets in the frequency domain. Further, resource reuse configurations may be used to provide efficient use of resources that are not utilized to provide control information within transmissions comprising Coresets and Coreset groups. The aforementioned improvements or enhancements provided by the method 800 are described for purposes of illustration, rather than by way of limitation, and additional advantages that may be realized by configuring transmissions using Coresets and Coreset groups in accordance with the method 800 may be readily apparent to a person skill in the art.

Figure 9:
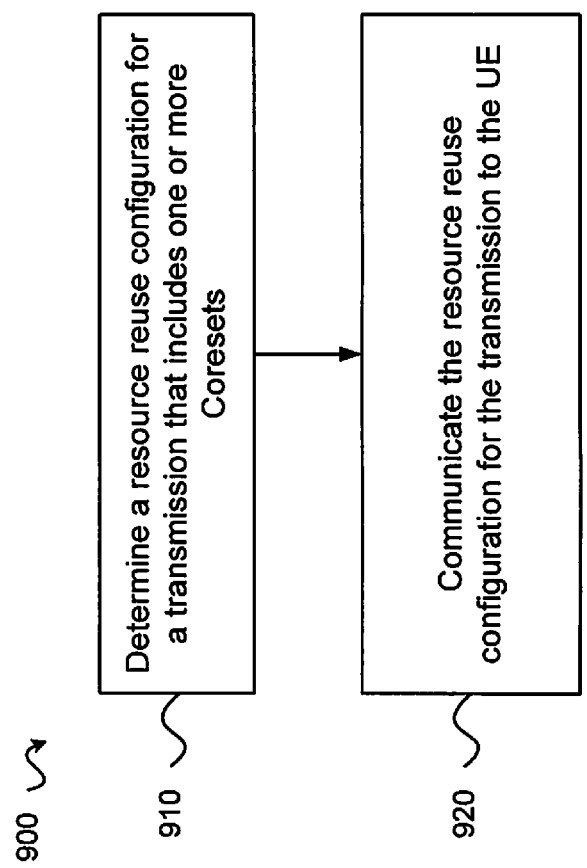
FIG. 9 is a flow diagram of an exemplary method for configuring a resource reuse configuration of a transmission that includes one or more Coresets in accordance with embodiments.

Referring FIG. 9, a flow diagram of an exemplary method for configuring a resource reuse configuration of a transmission that includes one or more Coresets in accordance with embodiments is shown as a method 900. In embodiments, the method 900 may be stored as instructions at a computer-readable medium. The instructions, when executed by one or more processors (e.g., one or more of the processors of the gNB 105 described and illustrated with respect to FIGS. 1 and 2), may cause the one or more processors to perform operations for configuring a resource reuse configuration of a transmission that includes one or more control resource sets (Coresets) in accordance with embodiments, as described above with respect to FIGS. 4-6, and as described in more detail below.

At 910, the method 900 includes determining, by a base station, a resource reuse configuration for a transmission that includes one or more Coresets. In embodiments, the resource reuse configuration may indicate a scheme for utilizing unused resources in the one or more Coresets for data transmission, as described above with reference to FIGS. 4-6. In embodiments, the scheme for utilizing unused resources of the transmission may indicate that resources that are not assigned to the one or more Coresets are reusable. In embodiments, the scheme for utilizing unused resources of the transmission may additionally or alternatively indicate that resources associated with empty symbols within the one or more Coreset are reusable. As explained above, the one or more Coresets may include a plurality of Coresets arranged into one or more Coreset groups, and the resource reuse configuration for the transmission may include a scheme for utilizing unused resources of the transmission for each of the one or more Coreset groups. In embodiments, a particular Coreset group of the one or more Coreset groups may be associated with a scheme for utilizing unused resources of the transmission that indicates resources that are not assigned to the one or more Coreset groups are reusable and that resources associated with empty symbols within the particular Coreset group are reusable. In embodiments, the one or more Coreset groups may include at least a first Coreset group and a second Coreset group, where the first Coreset group has a first scheme for utilizing unused resources of the transmission and the second Coreset group has a second scheme for utilizing unused resources of the transmission, where the first scheme and the second scheme may be different. In embodiments, the first scheme and the second scheme may be configured for narrow band monitoring by the UE, as explained above with reference to FIG. 7. In embodiments, in at least one Coreset group of the one or more Coreset groups, the primary Coreset may have a pre-determined configuration and the secondary Coreset may have a dynamic configuration, as described above.

At 920, the method 900 includes communicating the resource reuse configuration for the transmission to the UE. Configuring a resource reuse configuration for a transmission that includes one or more Coresets may enable Coresets and/or Coreset groups to be dynamically configured, such as based on an amount of control information to be included in each Coreset, a number of UEs configured for each Coreset and/or Coreset group, etc. This may enable efficient utilization of resources in transmissions that include one or more Coresets and/or Coreset groups, as described above with reference to FIGS. 4-7. The aforementioned improvements or enhancement provided by the method 900 are described for purposes of illustration, rather than by way of limitation, and additional advantages that may be realized by configuring transmissions using Coresets and Coreset groups in accordance with the method 900 may be readily apparent to a person skill in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 2 and 7-9 may comprise processors, electronics devices, hardware devices, electronics components, logical circuits, memories, software codes, firmware codes, etc., or any combination thereof. For example, one or more of the processors of the gNB 105 illustrated FIG. 2 may be utilized to perform the operations described with respect to the methods 700 and 900 for configuring a transmission utilizing one or more Coresets and Coreset groups, where the configuration of the Coresets and/or Coreset groups may include aspects of the configurations illustrated and described with reference to FIGS. 4-9. As another example, the one or more processors of the UE 115 illustrated in FIGS. 1 and 2 may be utilized to perform the operations described with respect to the method 800 for receiving data of a transmission that utilizes one or more Coresets and Coreset groups, where the configuration of the Coresets and/or Coreset groups may include aspects of the configurations illustrated and described with reference to FIGS. 4-9.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, the method comprising:
   receiving, at a user equipment (UE), information identifying one or more control resource set (Coreset) groups;
   monitoring, by the UE, a transmission to detect at least one Coreset group of the one or more Coreset groups and receive control information provided via a Coreset of the at least one Coreset group, wherein the control information comprises downlink control information (DCI) that includes a field to indicate a Coreset resource reuse configuration, and wherein the field includes one sub-field for each Coreset group; and
   in response to detecting the at least one Coreset group of the one or more Coreset groups, receiving, by the UE, information via the at least one Coreset group.

2. The method of claim 1, wherein at least one Coreset group of the one or more Coreset groups comprises a first Coreset and a second Coreset, and wherein the first Coreset provides a common search space to be monitored by the UE and the second Coreset provides a UE specific search space for the UE.

3. The method of claim 1, wherein the UE performs the monitoring over a narrow band of radio frequencies.

4. The method of claim 1, wherein the one or more Coreset groups comprise at least two Coreset groups, and wherein the at least two Coreset groups are transmitted by a base station over a wide band of radio frequencies.

5. The method of claim 1, wherein the one or more Coreset groups comprise at least two Coreset groups, and wherein the UE is configured to monitor at least one Coreset group to receive the information.

6. The method of claim 1, wherein the transmission comprises a multicarrier transmission that utilizes at least two carriers, the method further comprising:
   monitoring, by the UE, a first carrier of the at least two carriers to receive the control information provided via the Coreset of the at least one Coreset group; and
   monitoring, by the UE, a second carrier of the at least two carriers to receive other information provided via another Coreset of the at least one Coreset group.

7. The method of claim 6, wherein the control information and the other information are transmitted by a first base station.

8. The method of claim 6, wherein the control information is transmitted by a first base station and the other information is transmitted by a second base station.

9. A non-transitory computer-readable storage medium storing instructions that, when executed by one or more processors, cause the one or more processors to perform operations for wireless communication, the operations comprising:
   receiving, at a user equipment (UE), information identifying one or more control resource set (Coreset) groups;
   monitoring, by the UE, a transmission to detect information provided via at least one Coreset group of the one or more Coreset groups and receive control information provided via a Coreset of the at least one Coreset group, wherein the control information comprises downlink control information (DCI) that includes a field to indicate a Coreset resource reuse configuration, and wherein the field includes one sub-field for each Coreset group; and
   in response to detecting the information provided via the at least one Coreset group of the one or more Coreset groups, decoding, by the UE, the information.

10. The non-transitory computer-readable storage medium of claim 9, wherein at least one of the one or more Coreset groups comprises a first Coreset and a second Coreset, and wherein the first Coreset provides a common search space to be monitored by a UE and the second Coreset provides a UE specific search space for the UE.

11. The non-transitory computer-readable storage medium of claim 9, wherein the UE performs the monitoring over a narrow band of radio frequencies.

12. The non-transitory computer-readable storage medium of claim 9, wherein the one or more Coreset groups comprise at least two Coreset groups, and wherein the at least two Coreset groups are transmitted over a wide band of radio frequencies.

13. The non-transitory computer-readable storage medium of claim 9, wherein the one or more Coreset groups comprise at least two Coreset groups, and wherein the UE is configured to monitor at least a first Coreset of at least one of the one or more Coreset groups to receive the information.

14. The non-transitory computer-readable storage medium of claim 9, wherein the transmission comprises a multicarrier transmission that utilizes at least two carriers, the operations further comprising:
monitoring, by the UE, a first carrier of the at least two carriers to receive the control information provided via the Coreset of the at least one Coreset group; and
monitoring, by the UE, a second carrier of the at least two carriers to receive other information provided via another Coreset of the at least one Coreset group.

15. The non-transitory computer-readable storage medium of claim 14, wherein the control information and the other information are transmitted by a first base station.

16. The non-transitory computer-readable storage medium of claim 14, wherein the control information is transmitted by a first base station and the other information is transmitted by a second base station.

17. An apparatus for wireless communication, the apparatus comprising:
one or more processors configured to:
receive information identifying one or more control resource set (Coreset) groups;
monitor a transmission to detect at least one Coreset group of the one or more Coreset groups and to receive control information provided via a Coreset of the at least one Coreset group, wherein the control information comprises downlink control information (DCI) that includes a field to indicate a Coreset resource reuse configuration, and wherein the field includes one sub-field for each Corset group; and
receive information via the at least one Coreset group in response to detecting the at least one Coreset group of the one or more Coreset groups in the transmission; and
a memory coupled to the one or more processors.

18. The apparatus of claim 17, wherein at least one of the one or more Coreset groups comprises a first Coreset and a second Coreset, and wherein the first Coreset provides a common search space to be monitored by a UE and the second Coreset provides a UE specific search space for the UE.

19. The apparatus of claim 17, wherein the one or more processors are configured to monitor the transmission over a narrow band of radio frequencies.

20. The apparatus of claim 17, wherein the one or more Coreset groups comprise at least two Coreset groups, and wherein the at least two Coreset groups are transmitted over a wide band of radio frequencies.

21. The apparatus of claim 17, wherein the one or more Coreset groups comprise at least two Coreset groups, and wherein the one or more processors are configured to monitor at least one Coreset group to receive the information.

22. The apparatus of claim 17, wherein the transmission comprises a multicarrier transmission that utilizes at least two carriers, and wherein the one or more processors are configured to:
monitor a first carrier of the at least two carriers to receive the control information provided via the Coreset; and
monitor a second carrier of the at least two carriers to receive other information provided via at least one other Coreset.

23. The apparatus of claim 22, wherein the control information and the other information are transmitted by a first base station.

24. The apparatus of claim 22, wherein the control information is transmitted by a first base station and the other information is transmitted by a second base station.

25. An apparatus for wireless communication, the apparatus comprising:
means for receiving, at a user equipment (UE), information identifying one or more control resource set (Coreset) groups;
means for monitoring a transmission to detect at least one Coreset group of the one or more Coreset groups and to receive control information provided via a Coreset of the at least one Coreset group, wherein the control information comprises downlink control information (DCI) that includes a field to indicate a Coreset resource reuse configuration, and wherein the field includes one sub-field for each Corset group; and
means for receiving information in response to detecting the at least one Coreset group.

26. The apparatus of claim 25, wherein at least one of the one or more Coreset groups comprises a first Coreset and a second Coreset, and wherein the first Coreset provides a common search space to be monitored by a UE and the second Coreset provides a UE specific search space for the UE.

27. The apparatus of claim 25, wherein the means for monitoring is configured to monitor the transmission to detect the at least one Coreset group over a narrow band of radio frequencies.

28. The method of claim 1, wherein the resource reuse configuration indicates a scheme for utilizing unused resources in one or more Coresets for data transmission.

29. The non-transitory computer-readable storage medium of claim 9, wherein the resource reuse configuration indicates a scheme for utilizing unused resources in one or more Coresets for data transmission.

30. The apparatus of claim 17, wherein the resource reuse configuration indicates a scheme for utilizing unused resources in one or more Coresets for data transmission.

* * * * *